(12) United States Patent
Brunner et al.

(10) Patent No.: US 8,025,338 B2
(45) Date of Patent: Sep. 27, 2011

(54) ADJUSTABLE HEAD RESTRAINT SYSTEM FOR AN AUTOMOTIVE VEHICLE SEAT

(75) Inventors: Stefan Brunner, Freising (DE); Markus Schmid, Allershausen (DE)

(73) Assignee: Lear Corporation, Southfield, MI (US)

( * ) Notice: Subject to any disclaimer, the term of this patent is extended or adjusted under 35 U.S.C. 154(b) by 186 days.

(21) Appl. No.: 12/397,100

(22) Filed: Mar. 3, 2009

(65) Prior Publication Data

US 2009/0243364 A1 Oct. 1, 2009

(30) Foreign Application Priority Data

Mar. 28, 2008 (DE) .................. 10 2008 016 202

(51) Int. Cl.
*B60N 2/48* (2006.01)
(52) U.S. Cl. ....................................... 297/410
(58) Field of Classification Search ................. 297/353, 297/410, 411.36
See application file for complete search history.

(56) References Cited

U.S. PATENT DOCUMENTS

| | | | |
|---|---|---|---|
| 4,113,310 A | 9/1978 | Kapanka | |
| 4,304,439 A | 12/1981 | Terada et al. | |
| 4,351,563 A | 9/1982 | Hattori | |
| 4,695,095 A * | 9/1987 | Faust et al. | 297/410 |
| 4,798,415 A | 1/1989 | Tanino et al. | |
| 4,830,434 A | 5/1989 | Ishida et al. | |
| 5,599,067 A * | 2/1997 | Schuelke et al. | 297/411.35 |
| 5,711,579 A * | 1/1998 | Albrecht | 297/410 |
| 5,848,823 A * | 12/1998 | Su | 297/411.36 |
| 6,899,395 B2 | 5/2005 | Yetukuri et al. | |
| 7,011,371 B1* | 3/2006 | Tsai | 297/411.36 |
| 7,661,763 B2* | 2/2010 | Tsai | 297/411.36 |
| 2007/0158990 A1 | 7/2007 | Hermansson et al. | |
| 2010/0084905 A1* | 4/2010 | Silbereisen et al. | 297/410 |

FOREIGN PATENT DOCUMENTS

| | | |
|---|---|---|
| DE | 19730911 A1 | 1/1999 |
| DE | 19839713 A1 | 3/2000 |
| EP | 0970846 A1 | 1/2000 |

* cited by examiner

*Primary Examiner* — Peter R. Brown

(74) *Attorney, Agent, or Firm* — Brooks Kushman P.C.

(57) ABSTRACT

A support structure of a head restraint system for an automotive vehicle seat includes an actuator configured to be actuated by an occupant. A locking arrangement is disposable within a back of the vehicle seat and is configured to selectively secure the support structure relative to the back of the vehicle seat. At least a portion of the locking arrangement is operatively associated with the actuator.

19 Claims, 3 Drawing Sheets

ADJUSTABLE HEAD RESTRAINT SYSTEM FOR AN AUTOMOTIVE VEHICLE SEAT

CROSS-REFERENCE TO RELATED APPLICATIONS

This application claims foreign priority benefits under 35 U.S.C. §119(a)-(d) to DE 10 2008 016 202.7, filed Mar. 28, 2008, which is hereby incorporated by reference in its entirety.

BACKGROUND

1. Field of the Invention

The invention relates to adjustable head restraint systems for automotive vehicle seats.

2. Discussion

Automotive vehicle seats may include adjustable head restraint systems. U.S. Patent Publication 2007/0158990 to Hermansson et al. discloses one such adjustable head restraint system. Hermansson et al. provides a head restraint that includes a support for supporting the head restraint and fixing the head restraint to a backrest of a vehicle seat. The support includes a carrier and at least one support leg coupled to the carrier, together with an adjusting arrangement for adjusting the position of the head restraint in relation to an occupant of the motor vehicle. The carrier is enclosed by a casing, which is rotatably connected to the support along an axis of rotation running at right angles to the support leg. The adjusting arrangement includes a locking plate and an operating element acting upon the locking plate. The operating element is designed to carry the locking plate in a direction parallel to the axis of rotation. The locking plate has one locking tongue designed to interact with an adjusting arm firmly connected to the casing. The locking plate also has locking elements defining at least two separate locking positions on the adjusting arm, and one locking tongue designed to interact with locking elements arranged on the support leg, defining at least two separate locking positions on the support leg.

U.S. Pat. No. 6,899,395 to Yetukuri et al. discloses another adjustable head restraint system. Yetukuri et al. provides a head restraint assembly that permits four-way adjustment and has dual positive stops as well as a single control. The head restraint assembly includes a frame and a housing that engages a portion of the frame. The assembly further includes a cam assembly disposed within the housing to provide fore/aft adjustment of the housing relative to the frame. The cam assembly includes a camshaft and at least two drum assemblies supported by the camshaft. The cam assembly further includes a contact plate extending parallel to the camshaft to releasably engage the drum assemblies. The camshaft is connected to the contact plate to provide releasable engagement between the contact plate and the drum assemblies. The assembly further includes a control member to engage the cam assembly and provide for fore/aft and vertical adjustment in response to user input.

U.S. Pat. No. 4,798,415 to Tanino et al. discloses yet another adjustable head restraint system. Tanino et al. provides a device for adjusting the elevational position of a head rest of a seat for a vehicle. The device has a stay formed with a plurality of grooves along an elevational direction and is stood on a seat back of the seat. A locking mechanism is mounted in the shell of the head rest for engaging or disengaging the grooves of the stay by means of the lateral movements of the head rest. The stay has right and left vertical rods integrally coupled at the upper portions thereof with the stay, a bracket member provided in the shell and coupled with the two vertical rods of the stay through two cylindrical supporting members inserted therethrough with the two vertical rods of the stay, and a rod penetrated laterally through the shell and the bracket member to be secured to the shell but movably engaged with the bracket member in such a manner that the shell is urged to either leftward or rightward with respect to the bracket member with a gap formed at one side thereof. The grooves are formed on at least one vertical rod of the stay. A locking plate is formed in the vicinity of the bracket member and coupled with the rod. The locking plate engages any of the grooves of the vertical rod of the stay by means of urging. The engaging distance of the locking plate with the groove is equal to or substantially smaller than the gap formed at one side thereof.

SUMMARY

An adjustable head restraint system for an occupant of an automotive vehicle seat includes a support structure configured to limit head movements of the occupant. The support structure includes an actuator configured to be actuated by the occupant. The system also includes a locking arrangement disposable within a back portion of the seat and configurable to selectively secure the support structure relative to the back portion. At least a portion of the locking arrangement is operatively associated with the actuator.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
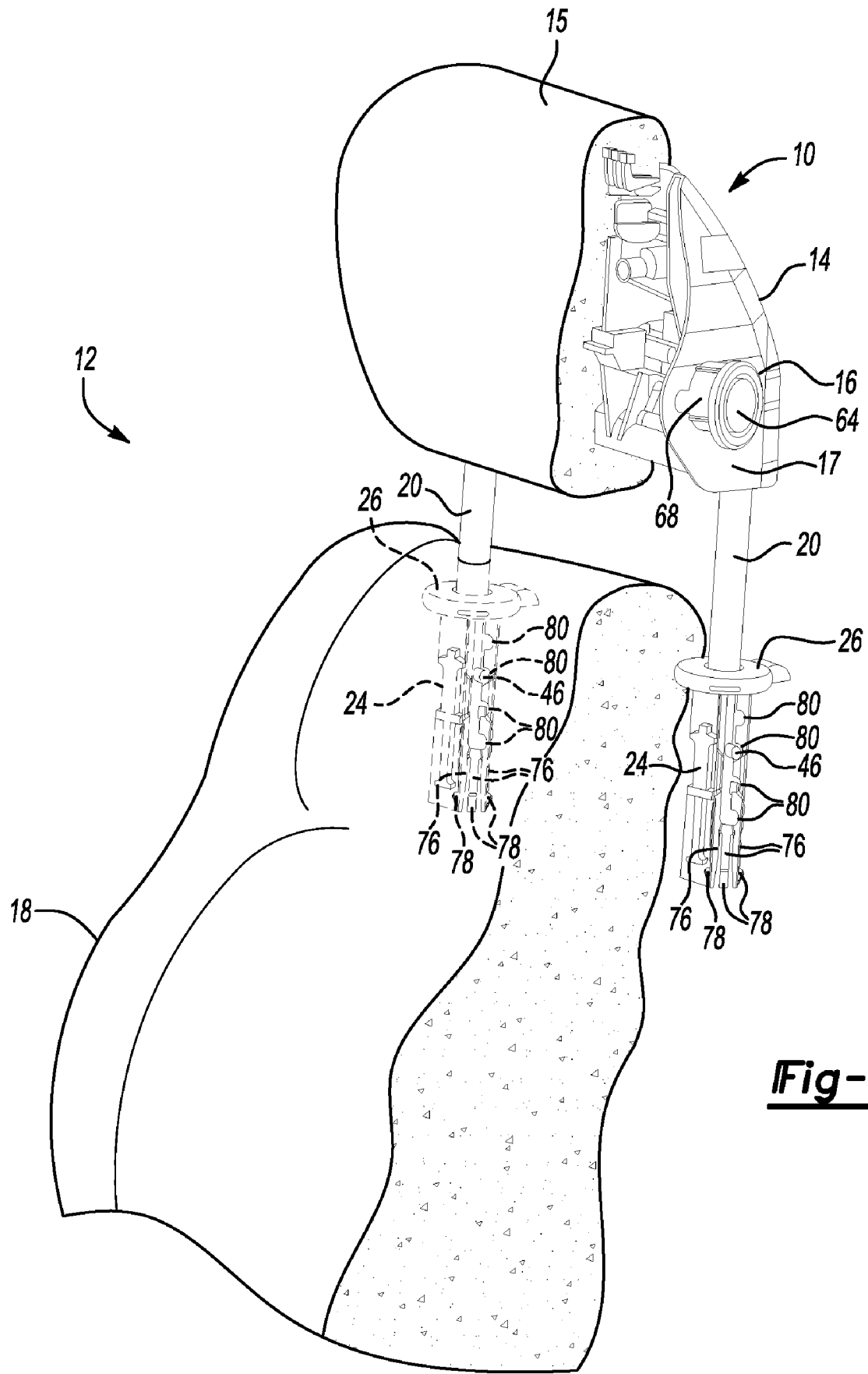
FIG. 1 is an assembly view, partially cut away, of an adjustable head restraint system for an automotive vehicle seat according to an embodiment of the invention.

Referring now to FIG. 1, a head rest 10 of an automotive vehicle seat 12 limits certain head movements of occupants (not shown) of the vehicle seat 12. The head rest 10 includes a structural member 14 surrounded by a cushion material 15. The head rest 10 also includes mechanical actuators 16, e.g., buttons, positioned on opposite lateral faces 17 of the head rest 10. The actuators 16, however, may be positioned on the head rest 10 as desired. As discussed below, the actuators 16, when actuated by an occupant, permit the occupant to adjust a height of the head rest 10 relative to a seat back 18 of the vehicle seat 12.

Column members 20 permit the head rest 10 to be positioned at various heights relative to the seat back 18. As known in the art, an end of each of the column members 20 is fixedly attached with the structural member 14 of the head rest 10. For example, the structural member 14 and column members 20 may be arranged in a snap fit relationship with each other. Alternatively, the column members 20 may be mechanically fastened with the structural member 14. Any suitable attachment method, however, may be used.

Another end of each of the column members 20 is received by respective sleeves 24. As known in the art, the sleeves 24 reside within, and are retained by, the seat back 18. For example, a brim 26 of each of the sleeves 24 may be attached with a frame (not shown) of the seat back 20. Additional techniques for retaining the sleeves 24 within the seat back 18 are discussed below in detail. Any suitable retention method, however, may be used.

As discussed below, the column members 20 and sleeves 24 cooperate to form respective locking mechanisms. These locking mechanisms are each operatively connected with one of the actuators 16 and permit the head rest 10 to be secured at various heights relative to the seat back 18.

Figure 2A:
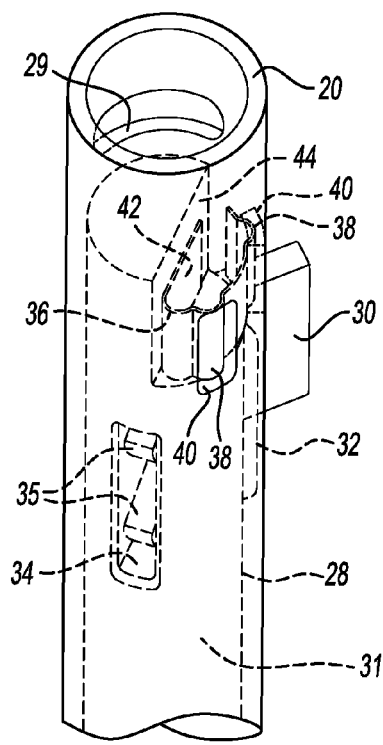
FIGS. 2A and 2B are enlarged views of a portion of the adjustable head restraint system of FIG. 1.
Figure 2B:
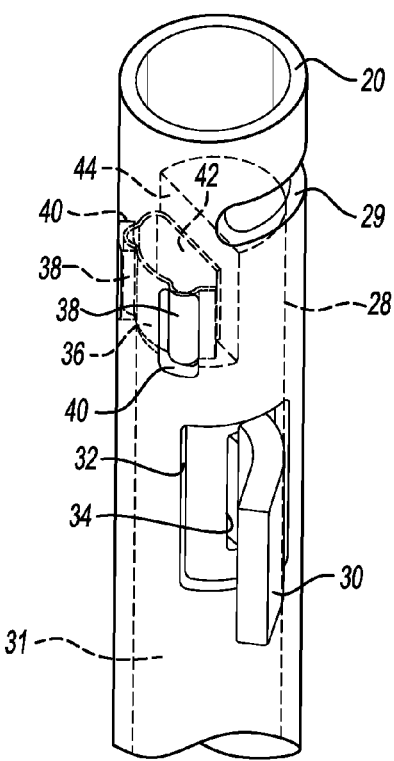

Referring now to FIGS. 2A and 2B, the end of the column member 20 illustrated is attached with the structural member 14 illustrated in FIG. 1. As such, the column member 20 includes a retention opening 29 that receives a snap feature (not shown) formed in the structural member 14 to secure the column member 20 to the structural member 14. Of course, the end illustrated may be configured differently depending upon the method of attachment with the structural member 14. For example, the end may include a threaded opening to receive a threaded fastener that would secure the structural member 14 to the column member 20.

The column member 20 is hollow and a spindle 28 is disposed therein. The spindle 28 spans substantially the entire length of the column member 20 and is sized such that the spindle 28 may rotate within the column member 20, i.e., an inner diameter of the column member 20 is greater than an outer diameter of the spindle 28. As discussed below, this rotation facilitates the locking and unlocking of the locking mechanisms discussed above and below in detail.

The spindle 28 includes a lever 30 and a spindle body 31. In the embodiment of FIGS. 2A and 2B, the lever 30 is clipped to the spindle body 31 through a lever passageway 32 of the column member 20. The spindle body 31 may include a throughway 34 to receive prongs 35 of the lever 30. During installation of the lever 30, the prongs 35 are squeezed together and inserted into the portion of the throughway 34 illustrated in FIG. 2B. As the prongs 35 travel towards the portion of the throughway 34 illustrated in FIG. 2A, they expand as the throughway 34 tapers out from the portion illustrated in FIG. 2B toward the portion illustrated in FIG. 2A. Any suitable technique, however, may be used to attach the lever 30 with the spindle body 31. For example, the lever 30 may instead include a threaded portion to be received by a mating threaded opening in the spindle body 31.

The lever passageway 32 is sized to permit the lever 30 to travel relative to the column member 20 as the spindle 28 rotates within the column member 20. A spring 36 is seated within the column member 20 and is configured to resist such rotation of the spindle 28. In the embodiment of FIGS. 2A and 2B, the spring 36 includes a pair of ribs 38 that set within rib receiving portions 40 of the column member 20. The spring 36 also includes a base portion 42 that is bonded with a flattened end 44 of the spindle body 31. The ribbed portion of the spring 36 is collapsed toward the base portion 42 as the spindle 28 rotates relative to the column member 20. This motion stores energy within the spring 36 that assists in returning the spindle 28 to its initial position in the absence of any forces to the contrary.

Figure 3A:
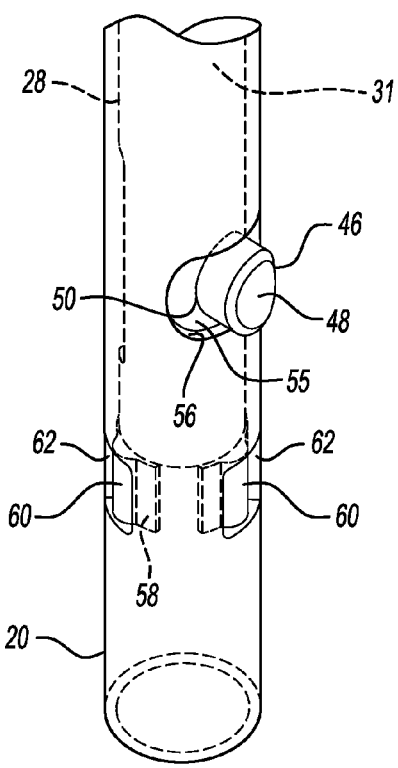
FIGS. 3A and 3B are enlarged views of another portion of the adjustable head restraint system of FIG. 1.
Figure 3B:
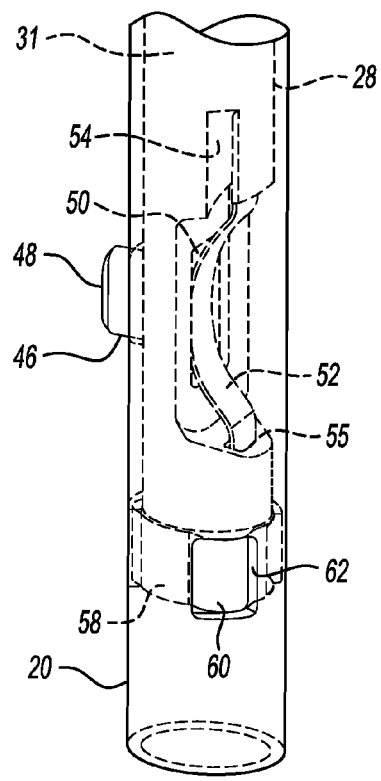

Referring now to FIGS. 3A and 3B, the end of the column member 20 illustrated is received by the sleeve 24 illustrated in FIG. 1. That is, the column member 20 may freely slide within the sleeve 24 provided that the locking mechanism discussed above and below is disengaged.

The spindle 28 of FIGS. 3A and 3B further includes a locking element 46, e.g., a pin, attached to the spindle body 31. In the embodiment of FIGS. 3A and 3B, a head 48 of the locking element 46 is inserted into a throughway 50 of the spindle body 31 configured to receive the head 48 of the locking element 46. A spring clip 52 of the locking element 46 is retained by retaining portions 54, 55 of the spindle body 31. In the embodiment of FIGS. 3A and 3B, the retaining portion 54 is a slot formed in the spindle body 31 that receives and retains an end of the spring clip 52. The retaining portion 55 is an opening formed in the spindle body 31 that receives another end of the spring clip 52. During installation of the locking element 46 with the spindle body 31, the head 48 is inserted into the portion of the throughway 50 illustrated in FIG. 3B, an end of the spring clip 52 is inserted into the opening 55 and another end of the spring clip 52 is slid into the slot 54.

As apparent to those of ordinary skill, the head 48 may be pushed toward the spindle body 31, thus deforming the spring clip 52, such that the head 48 is substantially flush with an exterior surface 55 of the spindle body 31 during assembly of the spindle body 31 with the column member 20. Other configurations and arrangements are, of course, also possible. For example, the locking element 46 may include a threaded portion that is installed into a threaded opening in the spindle body 31. Such a locking element 46 would be installed after the spindle body 31 is assembled with the column member 20.

A locking element passageway 56 of the column member 20 permits the head 48 of the locking element 46 to project through the column member 20. The locking element passageway 56 is sized to permit the head 48 to travel relative to the column member 20 as the spindle 28 rotates within the column member 20. As explained below, this movement of the head 48 will disengage the locking element 46 from the sleeve 24 illustrated in FIG. 1.

A spring 58 is mounted within the column member 20 to assist in retaining the spindle 28 within the column member 20. The spring 58 includes ribbed portions 60 that are received by rib receiving portions 62 of the column member 20. The spindle 28 is thus supported at its bottom by the spring 58.

Figure 4:
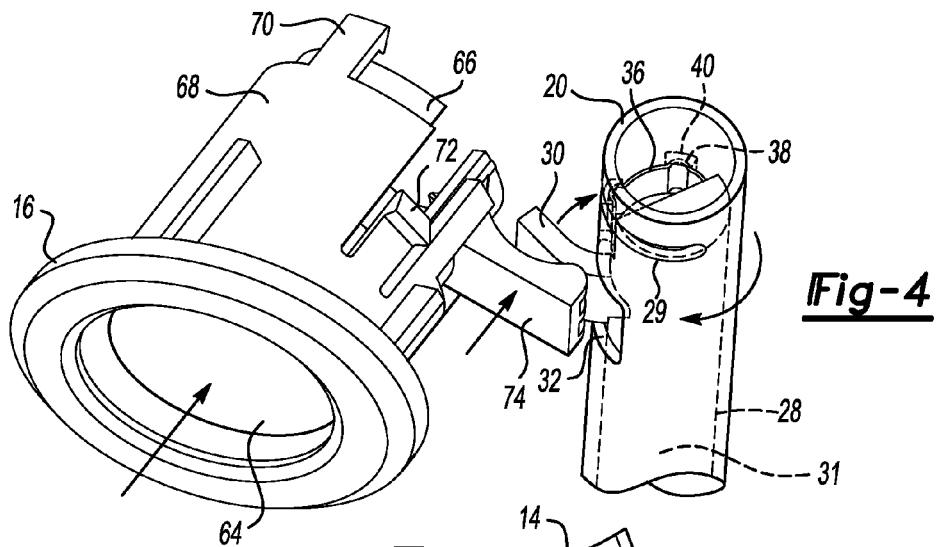
FIG. 4 is an enlarged view of yet another portion of the adjustable head restraint system of FIG. 1.
Figure 5:
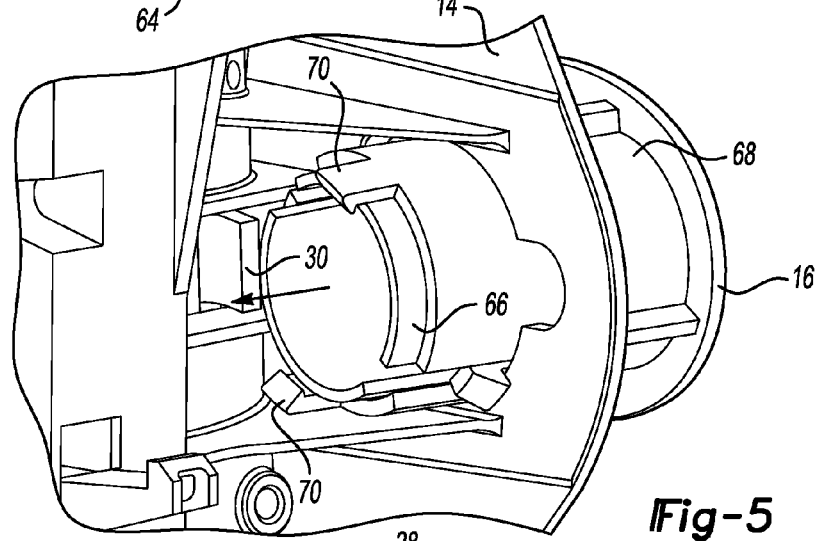
FIG. 5 is an enlarged view of still yet another portion of the adjustable head restraint system of FIG. 1.

Referring now to FIGS. 4 and 5, an embodiment of the actuator 16 includes a button portion 64 formed on an end of a cylinder 66. The cylinder 66 rides within a cylinder housing 68 of the actuator 16. Retention features 70 formed at an end of the cylinder housing 68 opposite the button portion 64 limit the travel of the cylinder 66 and thus the button portion 64.

A snap feature 72 is formed with the cylinder housing 68. The snap feature 72 secures the actuator 16 with the structural member 14 when snapped in place. Any suitable method of attachment, however, may be used.

A lever 74 formed on an end of the cylinder 66 opposite the button portion 64 projects radially away from the cylinder 66. As discussed below, the lever 74 engages the lever 30 attached with the spindle body 31 to rotate the spindle 28 within the column member 20.

Figure 6:
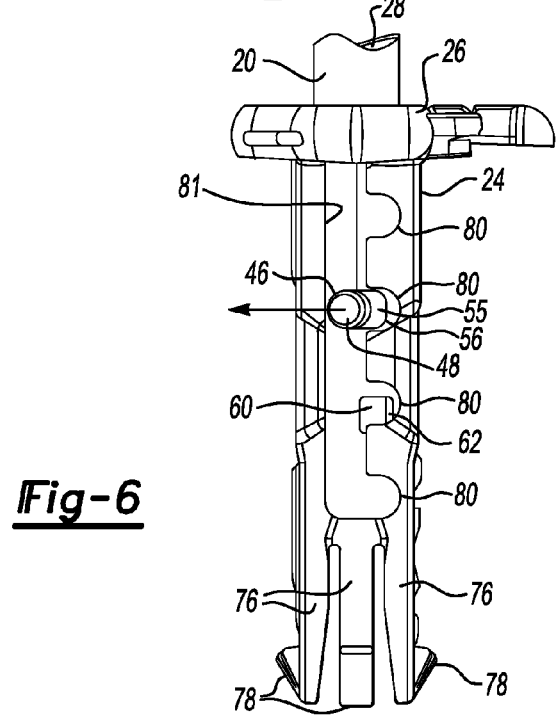
FIG. 6 is an enlarged view of still yet a further portion of the adjustable head restraint system of FIG. 1.

Referring now to FIG. 6, the sleeve 24 includes leg portions 76 formed on an end of the sleeve 24 opposite the brim 26. The leg portions 76 include snap features 78 formed thereon that further secure the sleeve 24 relative to the seat back 18 when the snap features 78 are snapped in place with a mating support structure (not shown) of the seat back 18. Any suitable attachment technique, however, may be used.

A plurality of apertures, such as channels 80, is formed above the leg portions 76 of the sleeve 24, and the channels 80 are joined by a passage 81. Each of the plurality of channels 80 may cooperate with the head 48 of the locking element 46 to lock the column member 20 in place relative to the sleeve 24. The channels 80 are shaped to accommodate the cylindrical shape of the head 48 of the locking element 46. The channels 80, however, may take any desired shape to accommodate the locking element 46. For example, in embodiments where the locking element 46 takes the form of a lever, the channels 80 may be formed as slots. Of course, the locking element 46 may be formed on the sleeve 24 and the channels 80 may be formed on the spindle 28. Other configurations and arrangements are also possible.

Referring now to FIGS. 4 and 6, pushing the button portion 64 of the actuator 16 causes the lever 74 to move the lever 30 thus rotating the spindle 28 within the column member 20. This rotation disengages the head 48 of the locking element 46 from one of the plurality of channels 80 formed in the sleeve 24. Once disengaged, the height of the head rest 16 illustrated in FIG. 1 relative to the seat back 18 illustrated in FIG. 1 may be changed. As the height of the head rest 16 is adjusted, the head 48 of the locking element 46 will move along the passage 81.

Releasing the button portion 64 of the actuator 16 disengages the lever 74 from the lever 30. The spring 36 will then assist in re-engaging the head 48 of the locking element 46 with one of the plurality of channels 80.

Other embodiments may include only a single actuator 16 attached with the structural member 14. In such embodiments, the column member 20 associated with the actuator 16 may be the "master" and the other column member may be the "slave." As an example, one actuator 16 may actuate respective locking mechanisms associated with each of the column members 20 via a lever arrangement operatively associated with each locking mechanism. As another example, only one of the column members 20 may be provided with a locking mechanism. Other arrangements and configurations are also possible.

While embodiments of the invention have been illustrated and described, it is not intended that these embodiments illustrate and describe all possible forms of the invention. For example, a head rest of certain embodiments may include a lever operatively connected with a latching arrangement disposed in a seat back via a tensioned cable or rod disposed within a column member. Pulling the lever may cause the tensioned cable or rod to disengage the latching arrangement so that the head rest may be repositioned relative to the seat back. Releasing the lever re-engages the latching arrangement thus securing the head rest in place. Other configurations and arrangements, of course, are also possible.

The words used in the specification are words of description rather than limitation, and it is understood that various changes may be made without departing from the spirit and scope of the invention.

What is claimed is:

1. An adjustable head restraint system for an occupant of an automotive vehicle seat including a back portion, the system comprising:
   a support structure configured to limit head movements of the occupant, the support structure including an actuator configured to be actuated by the occupant;
   a support structure stem having a length and two ends, one of the ends being attached with the support structure;
   a locking arrangement being disposable within the back portion and configurable to selectively secure the support structure relative to the back portion, at least a portion of the locking arrangement being operatively associated with the actuator; and
   a shaft (i) being disposed within the support structure stem, (ii) having two shaft end portions and an axis of rotation parallel to the length of the support structure stem and (iii) configured to rotate about the axis of rotation in response to the actuator being actuated, one of the shaft end portions including the at least a portion of the locking arrangement.

2. The system of claim 1 wherein the locking arrangement includes a male portion and a female portion, and wherein one of the male portion and female portion is configured to move relative to the other of the male portion and female portion in response to the actuator being actuated.

3. The system of claim 2 further comprising a sleeve being at least partially disposable within the back portion, wherein the female portion is formed on the sleeve.

4. The system of claim 2 wherein the male portion comprises a pin.

5. The system of claim 2 wherein the female portion comprises a notch.

6. The system of claim 2 further comprising a spring configured to resist movement of the one of the male portion and female portion relative to the other of the male portion and female portion.

7. The system of claim 1 wherein the other of the ends is moveable within the back portion of the vehicle seat while the actuator is being actuated.

8. The system of claim 1 further comprising a lever operatively associated with the actuator and attached with the other of the shaft end portions.

9. The system of claim 1 wherein the actuator comprises a button.

10. A seat for an occupant of an automotive vehicle, the seat including a back portion, the seat comprising:
    a head rest including a mechanical actuator configured to receive input from the occupant of the vehicle seat;
    a sleeve disposed at least partially within the back portion and including an aperture;
    a hollow shaft configured to support the head rest and having opposing ends and a length, one end being fixedly connected with the head rest and the other end configured to be received by the sleeve and including a surface defining an opening; and
    a spindle disposed within the shaft and having (i) end portions and (ii) an axis of rotation parallel to the length of the hollow shaft, one end portion being operatively associated with the actuator and the other end portion including a locking element configured to be received in the aperture of the sleeve, the locking element protruding through the opening of the hollow shaft, the spindle configured to rotate about the axis of rotation within the hollow shaft to move the locking element relative to the aperture in response to the input to the mechanical actuator from the occupant to permit the occupant to adjust the height of the head rest relative to the back portion.

11. The seat of claim 10 further comprising a lever attached with the one end portion of the spindle, wherein the one end portion of the spindle is operatively associated with the mechanical actuator via the lever.

12. The seat of claim 10 further comprising a spring disposed within the hollow shaft and configured to resist movement of the spindle within the hollow shaft.

13. The seat of claim 10 wherein the mechanical actuator comprises a button.

14. The seat of claim 10 wherein the locking element comprises a pin.

15. An adjustable head restraint system for an automotive vehicle seat, the system comprising:
- a head rest;
- a mechanical actuator disposed within the head rest and accessible from an exterior of the head rest;
- a hollow shaft having a length and two ends, one of the ends being attached with the head rest;
- a latching arrangement including a latching element and a latching element receiving portion, the latching arrangement being disposable within the seat and configured to selectively secure a position of the head rest relative to the seat, at least one of the latching element and latching element receiving portion being operatively associated with the mechanical actuator; and
- a spindle (i) being disposed within the hollow shaft, (ii) having two spindle end portions and an axis of rotation parallel to the length of the hollow shaft and (iii) configured to rotate about the axis of rotation in response to the mechanical actuator being actuated, one of the spindle end portions including the at least one of the latching element and latching element receiving portion.

16. The system of claim 15 further comprising a sleeve, wherein the latching element receiving portion is formed in the sleeve.

17. The system of claim 15 wherein the latching element comprises a pin.

18. The system of claim 15 wherein the mechanical actuator comprises a button.

19. The system of claim 15 further comprising a spring configured to resist actuation of the mechanical actuator.

* * * * *